(12) United States Patent
Moran (10) Patent No.: US 11,306,958 B2
(45) Date of Patent: Apr. 19, 2022

(54) GALLEY REFRIGERATION SYSTEM (71) Applicant: The Boeing Company, Chicago, IL (US)

(72) Inventor: Thomas Joseph Moran, Lake Stevens, WA (US)

(73) Assignee: THE BOEING COMPANY, Chicago, IL (US)

(*) Notice: Subject to any disclaimer, the term of this patent is extended or adjusted under 35 U.S.C. 154(b) by 228 days.

(21) Appl. No.: 16/679,011

(22) Filed: Nov. 8, 2019

(65) Prior Publication Data

US 2021/0140699 A1 May 13, 2021

(51) Int. Cl.
| F25D 15/00 | (2006.01) |
| B64D 11/04 | (2006.01) |
| B64D 11/00 | (2006.01) |
| B64D 13/06 | (2006.01) |
| F25B 41/20 | (2021.01) |

(52) U.S. Cl.
CPC .......... *F25D 15/00* (2013.01); *B64D 11/0007* (2013.01); *B64D 11/04* (2013.01); *B64D 13/06* (2013.01); *F25B 41/20* (2021.01); *B64D 2013/0629* (2013.01); *F25B 2600/2515* (2013.01); *F25D 2400/20* (2013.01)

(58) Field of Classification Search
CPC ...... F25D 15/00; F25D 2400/20; F25B 41/20; F25B 2600/2515; B64D 11/04; B64D 13/06
See application file for complete search history.

(56) References Cited

U.S. PATENT DOCUMENTS

| 9,802,703 | B2 | 10/2017 | Moran |
| 9,957,050 | B2 | 5/2018 | Moran |
| 10,207,807 | B2 | 2/2019 | Moran et al. |
| 10,273,010 | B2 | 4/2019 | Moran et al. |
| 10,287,017 | B2 | 5/2019 | Moran et al. |
| 10,337,776 | B2 | 7/2019 | Moran |
| 2017/0144763 | A1 | 5/2017 | Moran |
| 2018/0127098 | A1 | 5/2018 | Moran |
| 2018/0134389 | A1* | 5/2018 | Singleton .............. F25D 17/045 |
| 2019/0002105 | A1 | 1/2019 | Moran et al. |

* cited by examiner

*Primary Examiner* — Elizabeth J Martin
(74) *Attorney, Agent, or Firm* — Alleman Hall Creasman & Tuttle LLP (57) ABSTRACT

A galley refrigeration system is provided in which a galley cart is positioned in the cavity of a galley compartment comprising at least a cart-facing opening positioned in a vertically intermediate region of the back wall, the galley cart or the galley compartment having a duct-facing opening positioned adjacent to the cart-facing opening. A heat exchanger configured to generate cooling air is provided within the galley compartment, adjacent the vertically intermediate region of the back wall of the galley compartment defining the cavity. An air supply duct, provided at the cart-facing opening, is configured to guide the cooling air from the heat exchanger into the galley cart, and configured to be detachably coupled to the duct-facing opening of the cart or the galley compartment. An electronically actuated valve controls a variable flow rate of the cooling air from the air supply duct into the galley cart.

20 Claims, 7 Drawing Sheets

GALLEY REFRIGERATION SYSTEM

FIELD

The present disclosure relates to aircraft galley refrigeration systems.

BACKGROUND

Commercial aircraft transporting passengers typically include one or more galleys to store food and beverages on the aircraft. The food and beverages are typically stored in galley carts and containers which are transported to the aircraft and stored in refrigerated compartments or zones in the galleys. A heat exchanger is typically located outside the galley and installed on the top of, underneath, or in back of the galley. It supplies cooled air to each of the compartments or zones via a plurality of air ducts and other components. The cooled air ducts and the supply and return devices associated with the air ducts are routed along the rear wall of the galley to the galley compartment to supply the cooled air either directly to the galley carts in an air-through system or directly to the compartment in an air-over system and to return the air to the heat exchanger. For example, vertical ducts may extend from the heat exchanger, located above the galley, down the rear wall of the galley to the level of galley compartment, which is located at the bottom of the galley. Horizontal ducts may extend from the corresponding vertical ducts along the various galley carts to supply the air to, or return the air from, the galley carts and/or the galley compartment.

In conventional galley refrigeration systems, a large amount of space is required for the airflow supply and return components, such as the ducts and the valves that interface with the galley carts, taking up a large amount of cabin space and leading to higher heat gain and lower efficiency. The heat exchangers are installed outside of the galley due to size and noise, leading to higher factory installation costs, especially for heat exchangers that integrally interface with the plumbing system and environmental control system of the aircraft. Since conventional galley refrigeration systems are physically integrated into the aircraft's environmental control system ducting that travel into the crown of the galley monument, where the heat exchangers are placed, the conventional galley refrigeration system for any given aircraft is required to be custom designed around the unique technical requirements of each specific aircraft application, such that the dimensions and physical configurations of the ducting and heat exchangers may widely differ from aircraft to aircraft. This lack of uniformity and standardization in the design, dimensions, and physical configurations of conventional galley refrigeration systems is associated with increased design, installation, maintenance, and operational costs.

SUMMARY

To address the above issues, according to one aspect of the present disclosure, a galley refrigeration system is provided comprising a galley compartment comprising at least a back wall and a pair of side walls defining a cavity, the galley compartment comprising at least a cart-facing opening positioned in a vertically intermediate region of the back wall; a galley cart positionable in the cavity of the galley compartment, the galley cart or the galley compartment having a duct-facing opening, the duct-facing opening being positioned adjacent to the cart-facing opening of the galley compartment for air-through-cart or air-over-cart cooling of the galley cart; a heat exchanger configured to generate cooling air; an air supply duct provided at the cart-facing opening in the vertically intermediate region of the back wall, configured to guide the cooling air from the heat exchanger into the galley cart, and configured to be detachably coupled to the duct-facing opening in flow communication with the duct-facing opening; and a docking interface configured to detachably couple a first air supply duct port of the air supply duct at the cart-facing opening to the duct-facing opening, the docking interface comprising an electronically actuated valve for controlling a variable flow rate of the cooling air from the air supply duct into the galley cart. At least a portion of the heat exchanger is provided within the galley compartment, adjacent the vertically intermediate region of the back wall of the galley compartment defining the cavity.

Another aspect of the present disclosure relates to a galley refrigeration system comprising: a galley compartment comprising at least a back wall and a pair of side walls defining a cavity, the galley compartment comprising at least a cart-facing opening positioned in a lower region of the back wall; a galley cart positionable in the cavity of the galley compartment, the galley cart or the galley compartment having a duct-facing opening, the duct-facing opening being positioned adjacent to the cart-facing opening of the galley compartment for air-through-cart or air-over-cart cooling of the galley cart; a heat exchanger configured to generate cooling air and provided adjacent to the cart-facing opening; an air return duct configured to guide heated air from the galley cart into the heat exchanger, and configured to be detachably coupled to the heat exchanger; a docking interface configured to detachably couple a first air supply duct port of the air supply duct at the cart-facing opening to the duct-facing opening of the galley cart, the docking interface comprising an electronically actuated valve for controlling a variable flow rate of the cooling air from the air supply duct into the galley cart. At least a portion of the heat exchanger is provided within the galley compartment and adjacent to the lower region of the back wall of the galley compartment defining the cavity.

Yet another aspect of the present disclosure relates to a galley refrigeration system adaptable for use on multiple different aircraft, each aircraft having a differently sized galley, the galley refrigeration system comprising: a first galley compartment comprising at least a back wall and a pair of first side walls defining a first cavity, the first galley compartment comprising at least a first cart-facing opening; a second galley compartment comprising at least the back wall and a pair of second side walls defining a second cavity, the second galley compartment comprising at least a second cart-facing opening; a first galley cart positionable in the first cavity of the first galley compartment, the first galley cart having a first duct-facing opening, the first duct-facing opening of the first galley cart being positioned adjacent to the first cart-facing opening of the first galley compartment for air-through-cart cooling of the first galley cart; a second galley cart positionable in the second cavity of the second galley compartment, the second galley cart having a second duct-facing opening, the second duct-facing opening of the second galley cart being positioned adjacent to the second cart-facing opening of the second galley compartment for air-through-cart cooling of the second galley cart; a heat exchanger configured to generate cooling air; an air supply duct provided at the first cart-facing opening and the second cart-facing opening, configured to guide the cooling air from the heat exchanger into the first galley cart and the second galley cart, a first air supply duct port of the air supply duct configured to be detachably coupled to the first duct-facing opening of the first cart in flow communication with the first duct-facing opening of the first galley cart, and a second air supply duct port of the air supply duct configured to be detachably coupled to the second duct-facing opening of the second cart in flow communication with the second duct-facing opening of the second galley cart; a first docking interface configured to detachably couple the first air supply duct port of the air supply duct at the first cart-facing opening to the first duct-facing opening of the first galley cart, the first docking interface comprising a first electronically actuated valve for controlling a variable flow rate of the cooling air from the air supply duct into the first galley cart; a second docking interface configured to detachably couple the second air supply duct port of the air supply duct at the second cart-facing opening to the second duct-facing opening of the second galley cart, the second docking interface comprising a second electronically actuated valve for controlling a variable flow rate of the cooling air from the air supply duct into the second galley cart; and a controller operatively coupled to the first docking interface and the second docking interface. The controller controls valve positions of the first docking interface and the second docking interface to balance an air pressure gradient within the air supply duct connecting the first galley compartment and the second galley compartment with the heat exchanger.

The features, functions, and advantages that have been discussed can be achieved independently in various embodiments or may be combined in yet other embodiments further details of which can be seen with reference to the following description and drawings.

DETAILED DESCRIPTION

Figure 1:
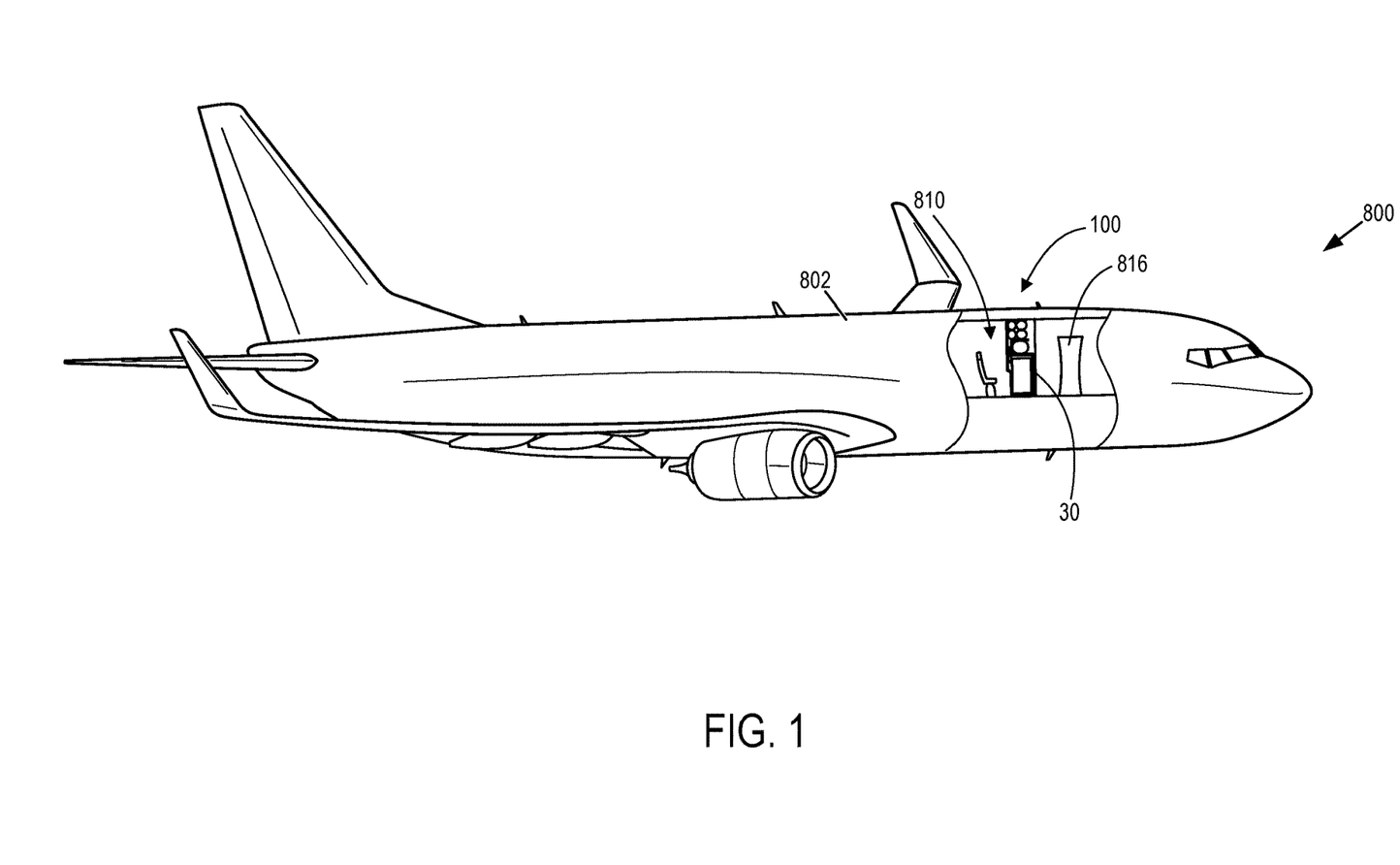
FIG. 1 is a schematic illustration of an exemplary aircraft including a galley monument and galley system in accordance with a first embodiment.
Figure 2:
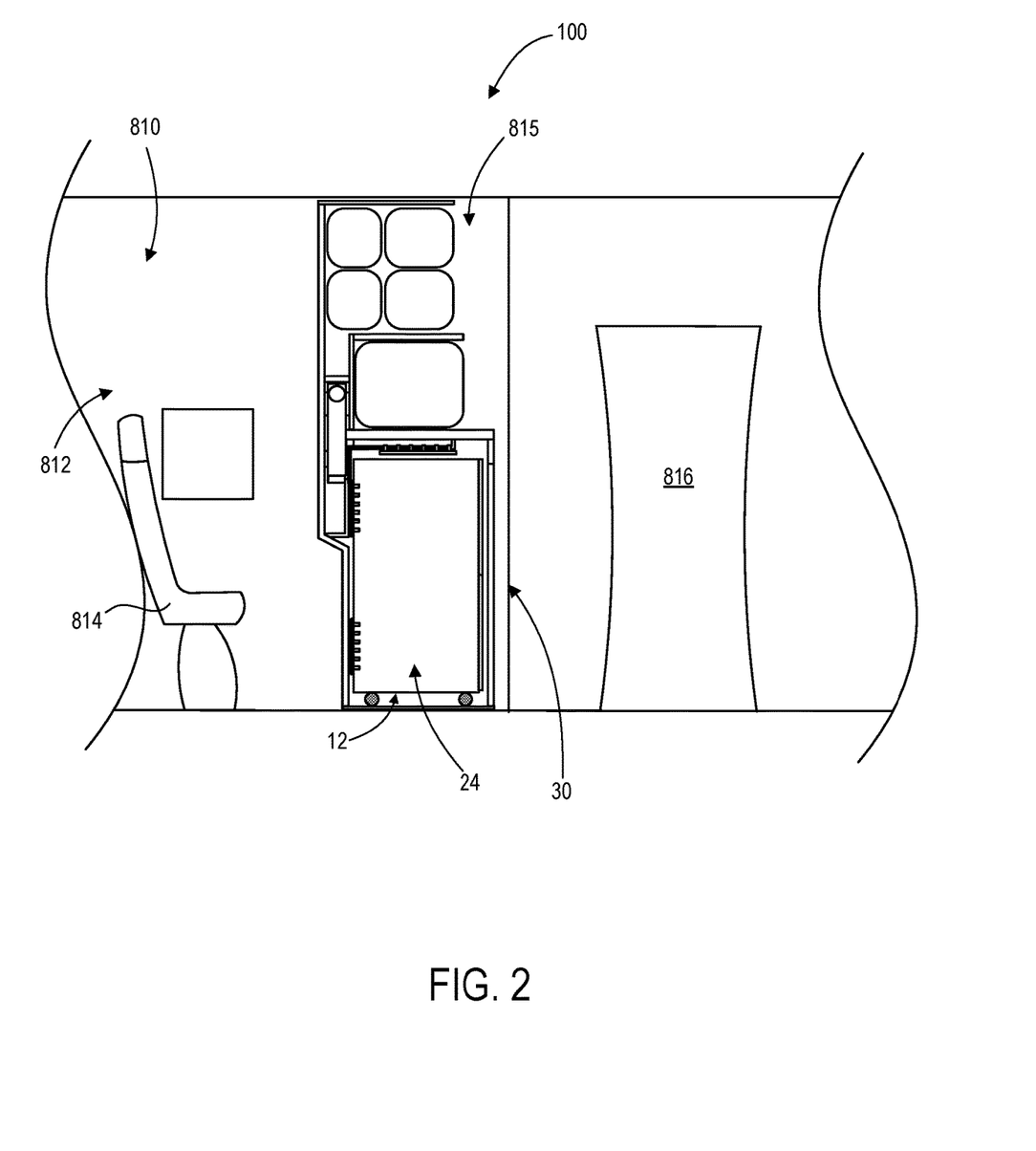
FIG. 2 is a schematic illustration of an exemplary galley refrigeration system for an aircraft in accordance with the first embodiment.

Referring to FIGS. 1 and 2, an exemplary galley refrigeration system 100 for an aircraft 800 is schematically illustrated. The galley refrigeration system 100 is used to cool galley carts 24 held in galley compartments 12 of a galley monument 30. The galley monument 30 defines one or more galley compartments 12, which are typically arranged below a counter of the galley monument 30. The galley monument 30 is positioned within a cabin 810 and body 802 of the aircraft 800. The cabin 810 of the aircraft 800 is divided into a passenger area 812, where passenger seats 814 are located, and a galley area 815, where the galley monument 30 is located. The passenger area 812 is the area exterior of the galley monument 30 within the aircraft 800 where passengers are able to be located. Space dedicated to the galley monument 30 is unusable for passenger seats 814 or other purposes such as lavatories, and thus it may be desirable for aircraft manufacturers to reduce the footprint of the galley area 815 in order to increase the passenger area 812.

The galley monument 30 may include any suitable number of galley compartments 12 and the aircraft 800 may include any suitable number of galley monuments 30. For example, some aircraft may have as few as one galley compartment or as many as eight galley compartments for a given galley monument. Some commercial aircraft may include one galley monument, while others may have two, three, or more galley monuments. The galley monuments 30 are typically arranged near the doors 816 of the aircraft 800, such as in the front and/or back of the cabin 810, but may be located mid-cabin in some embodiments. The galley monuments 30 may be used for the storage and/or preparation of food or beverages. Some galley monuments may be bar units used strictly for preparation of beverages. Some galley monuments may be incorporated into other monuments used for other purposes such as closets, workstations, lavatories, and the like. Some galley monuments may be provided overhead or under floor in some embodiments, as opposed to being situated in the passenger cabin. As used herein a galley compartment 12 is an insulated volume that is utilized to store one or more galley carts 24 on the aircraft 800. A galley cart 24a, as used herein, is a portable device, which may be insulated, that is used to store food and/or beverages that are transported from a caterer to the aircraft 800 or from the galley compartments 12 to other parts of the aircraft 800 for serving the food and/or beverages. The galley carts 24 may include wheels 25, however some galley carts 24 may be hand carried boxes in some embodiments. The galley compartment 12 may include highly insulating panels that enhance the thermal efficiency of the galley refrigeration system 100.

Figure 3:
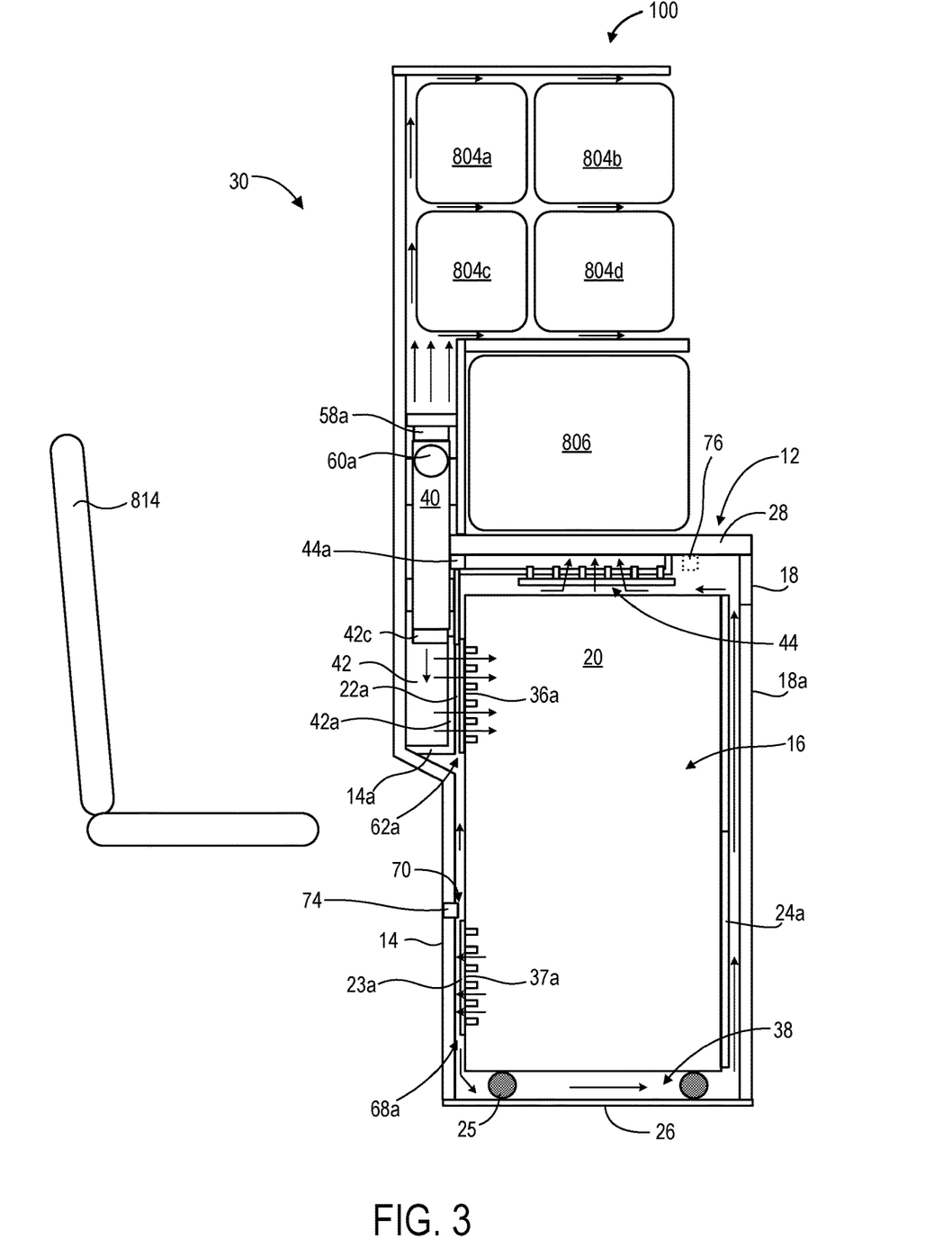
FIG. 3 is a cross-sectional side representation of a galley monument and exemplary galley refrigeration system in accordance with the first embodiment.

Referring to FIG. 3, a galley refrigeration system 100 is provided, comprising a galley compartment 12 comprising at least a back wall 14 and a pair of side walls 16 defining a cavity 20, the galley compartment 12 comprising at least an upper cart-facing opening 22a positioned in a vertically intermediate region 14a of the back wall 14. The upper cart-facing opening 22a may extend at least partially through the vertically intermediate region 14a of the back wall 14. The cavity 20, defined by at least the back wall 14 and the pair of side walls 16, is configured to receive at least a galley cart 24a.

In an exemplary embodiment, the cavity 20 of the galley compartment 12 may also be defined by a bottom wall 26, a top wall 28, and a front wall 18. The top wall 28 may be defined by the counter of a galley monument 30 which defines the galley compartment 12. In some embodiments, there may be a plurality of galley compartments 12, where the side walls 16 separate adjacent galley compartments 12. In alternative embodiments, there may be no internal side walls separating adjacent galley compartments 12, and each of the galley compartments 12 may be open to each other. The bottom wall 26 may be defined by a floor of the cabin. Non-cooled compartments and objects may be provided above the galley compartment 12, such as above the top wall 28 of the galley monument 30. Such non-cooled compartments and objects may include containers 804a-d and an oven 806, for example.

The galley refrigeration system 100 further comprises a galley cart 24a positionable in the cavity 20 of the galley compartment 12, the galley cart 24a having an upper duct-facing opening 36a, the upper duct-facing opening 36a of the galley cart 24a being positioned adjacent to the upper cart-facing opening 22a of the galley compartment 12 for air-through-cart cooling of the galley cart 24a. Although the duct-facing openings will be described throughout the disclosure as being provided on the galley carts, it will be appreciated that the duct-facing openings may alternatively be provided on the galley compartment 12 instead to enable air-over-cart cooling of the galley carts.

The front wall 18 of the galley compartment 12 may include at least a door 18a that may be opened to provide access to the cavity 20 of the galley compartment 12, such as to load and unload the galley cart 24a through the door 18a. The door 18a may be closed to retain the galley cart 24a in the galley compartment 12 and/or to enclose the cooling space in the cavity 20 and/or to provide thermal insulation. The door 18a may further be provided with low leakage door seals and highly insulating panels to further enhance thermal insulation. In an exemplary embodiment, when the galley cart 24a is positioned in the cavity 20, a space 38 is defined about the galley cart 24a. Air may be able to circulate in the galley compartment 12 around the galley cart 24a in the space 38. In some embodiments, at an in-flight steady state operation or between meal services for example, the air may only circulate in the space 38 by passing through the first air supply duct port 42a with a controllable electronically actuated valve 64a, thereby minimizing power consumption, airflow, air velocity, and noise.

The back wall 14 may be exposed to the exterior environment of the galley monument 30. The back wall 14 may be forward facing or rearward facing, depending on the orientation of the galley monument 30 within the cabin. The back wall 14 may face the passenger area 812 of the cabin, such that passenger seats 814 may be located behind the back wall 14; however, in alternative embodiments, the back wall 14 may be positioned against a bulkhead. The back wall 14 may define the back of the galley monument 30. For example, the back wall 14 may be exposed to the passenger area 812 of the cabin 810. The back wall 14 is provided opposite the front wall 18 and the door 18a.

The galley refrigeration system 100 includes a heat exchanger 40 that is configured to generate cooling air. At least a portion of the heat exchanger 40 is provided within the galley compartment 12, adjacent the vertically intermediate region 14a of the back wall 14 of the galley compartment 12 defining the cavity 20. The heat exchanger 40 may be provided adjacent to a counter area 28 of a galley monument 30, where the galley compartment 12 is provided below the counter area 28 of the galley monument 30. In this embodiment, the counter area 28 is defined by the top wall 28 of the galley monument 30.

Figure 4:
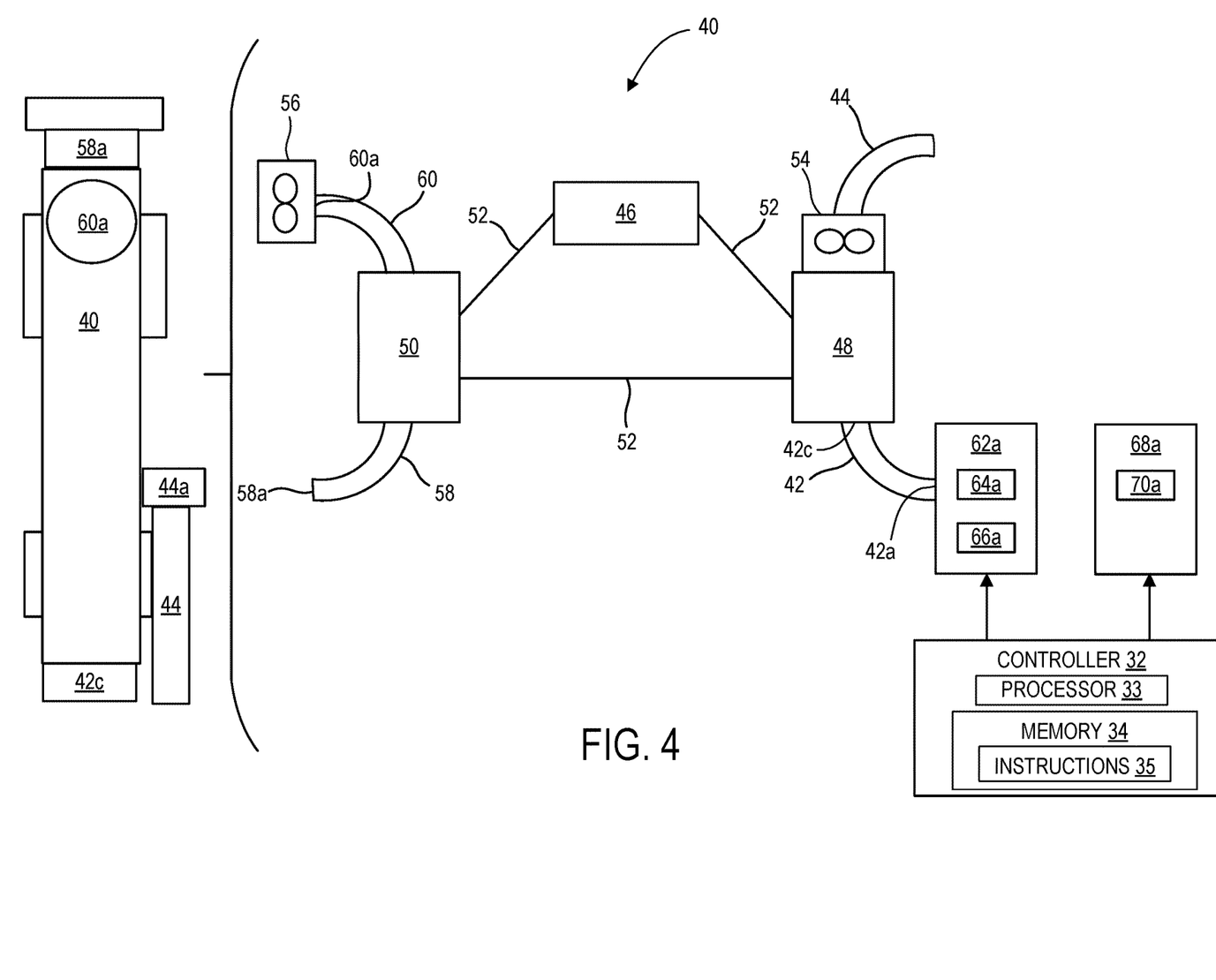
FIG. 4 is a schematic representation of a heat exchanger in accordance with the first embodiment.

Referring to FIG. 4, the heat exchanger 40 may be configured as an air chiller that includes an evaporator fan 54 used to increase the flow of air through the galley refrigeration system 100. The evaporator fan 54 forces the airflow through the air supply duct 42, the air return duct 44, and into the galley compartments 12. The evaporator fan 54 may be positioned downstream of the air return duct 44 and the heat exchanger 40 as illustrated, or between the air return duct 44 and the air supply duct 42. The evaporator fan 54 may be alternatively positioned upstream of the heat exchanger 40. In one embodiment, the heat exchanger 40 is a refrigeration unit, which comprises a compressor 46, an evaporator 48, and a condenser 50 provided with a condenser exhaust 58a and a condenser intake 60a, as well as an expansion valve (not shown). However, in other embodiments, it will be appreciated that the heat exchanger 40 may alternatively replace the compressor 46, the evaporator 48, and the condenser 50 with components of a thermoelectric cooler or a thermoacoustic cooler, for example. Refrigerant lines 52 are provided between the compressor 46, the condenser 50 and the evaporator 48 to transfer refrigerant through the heat exchanger 40. The refrigerant undergoes temperature changes in the compressor 46, the condenser 50, and the evaporator 48 when the heat exchanger 40 is operated. The refrigerant undergoes phase changes in the evaporator 48 and in the condenser 50 when the heat exchanger 40 is operated. The heat exchanger 40 transfers heat between the refrigerant and the airflow.

In an exemplary embodiment, a condenser supply duct 60 may be provided upstream of the condenser 50, and a condenser exhaust duct 58 may be provided downstream of the condenser 50. A condenser fan 56 may be provided upstream of the condenser supply duct 60 to promote airflow through the condenser supply duct 60, the condenser exhaust duct 58, and the condenser 50. The condenser supply duct 60 brings airflow to the condenser 50 which cools the condenser 50, and causes the airflow to be heated. The heated exhaust airflow is directed through the condenser exhaust duct 58 and may be expelled from the heat exchanger 40. The exhaust air may be discharged to a predetermined location within the aircraft 800. For example, the exhaust air may be discharged into the cabin 810 of the aircraft 800. In some embodiments, the condenser exhaust 58a may discharge exhaust air into an area around the oven 806 to result in the oven 806 using less energy.

During operation of the heat exchanger 40, the compressor 46 is operated to propel the refrigerant through the refrigerant lines 52. The refrigerant enters the compressor 46 as a vapor. The vapor is compressed by the compressor 46 and exits the compressor 46 superheated. The superheated vapor travels through the condenser 50, which cools and removes the superheat and then condenses the vapor into a liquid. The liquid refrigerant may pass through an expansion valve between the condenser 50 and the evaporator 48 to decrease the pressure of the refrigerant, which results in a mixture of liquid and vapor at a lower temperature and pressure. The cold liquid-vapor mixture travels through the evaporator 48, where the refrigerant is vaporized during cooling of the warm air. The vapor refrigerant then returns to the compressor 46. The heat exchanger 40 may include other components, such as expansion valves, bypass valves, and the like for operating the heat exchanger 40.

Referring back to FIG. 3, the galley refrigeration system 100 includes an air supply duct 42 and an air return duct 44, in flow communication with the heat exchanger 40 and the galley compartments 12, to channel the air supply from the heat exchanger 40 to the galley compartment 12 and back to the heat exchanger 40. At least the air supply duct 42 supplies cooled air to the galley compartment 12, and at least the air return duct 44 returns heated air to the heat exchanger 40. Air can flow into and out of the galley compartment 12 through the upper cart-facing opening 22a and the lower cart-facing opening 23a, respectively. The air supply duct 42 may be in flow communication with the upper cart-facing opening 22a.

The air supply duct 42 may be an internal air supply duct running downstream of the evaporator 48 along the back wall 14 and positioned within the galley compartment 12. The air supply duct 42 and/or the air return duct 44 may be embedded in the walls or structures defining the galley monument 30 and/or the cabinets, compartments, and the like of the galley monument 30. The air supply duct 42 and/or the air return duct 44 may be defined by separate structures, such as sheet metal ducts preformed and set in the walls. Alternatively, the air supply duct 42 and/or the air return duct 44 may be defined by the walls themselves, such as by bores or channels in the walls. The walls may define portions or sides of the air supply duct 42 and/or the air return duct 44.

In an exemplary embodiment, the air supply duct 42 is provided at the upper cart-facing opening 22a in the vertically intermediate region 14a of the back wall 14 and configured to guide the cooling air from the heat exchanger 40 into the galley cart 24a. The air supply duct 42 is detachably coupled to the upper duct-facing opening 36a of the galley cart 24a in flow communication with the upper duct-facing opening 36a of the galley cart 24a. The air supply duct 42 may further comprise a third air supply duct port 42c which is detachably attached to the heat exchanger 40. The third air supply duct port 42c may comprise an air seal. The air supply duct 42 may further comprise a first air supply duct port 42a which is detachably attached to the upper cart-facing opening 22a of the galley compartment 12. Cool air is expelled from the air supply duct 42 through the first air supply duct port 42a. An entirety of the air supply duct 42 may be provided within the galley compartment 12.

In the illustrated embodiment, the air return duct 44 is routed along the top wall 28 of the galley monument 30. The air return duct 44 includes an air return duct port 44a through which the cooled air is received from the galley compartment 12 or directly from the galley cart 24a and returned to the heat exchanger 40. The air return duct port 44a may comprise an air seal. The air return duct 44 may be detachably attached to the heat exchanger 40 and configured to guide heated air from the galley cart 24a into the heat exchanger 40. An entirety of the air return duct 44 may be provided within the galley compartment 12. The air return duct 44 may be upstream of the evaporator 48, bringing an airflow to the evaporator 48. The air flowing over the evaporator 48 is cooled and the cooled airflow is directed through the air supply duct 42 to the galley compartment 12, such as for cooling the galley carts or standard containers.

During use, air flows through the air supply duct 42 into the galley cart 24a. The air passes over the food or beverages in the galley cart 24a, such as by an air-through-cart supply arrangement. The air from the galley cart 24a then flows through the lower duct-facing opening 37a into the space 38. The door 18a closes the cavity 20 to define the space 38 and contain the air in the space 38. The air is able to flow around the outside of the galley cart 24a within the space 38 in an air-over-cart supply arrangement to the air return duct 44. By channeling around the galley cart 24a within the space 38, the galley refrigeration system 100 has the benefits of both an air-through-cart supply arrangement and an air-over-cart supply arrangement, which may increase the cooling performance of the galley refrigeration system 100.

Moreover, referring to FIGS. 3 and 4, an air supply docking interface 62a is provided to detachably couple a first air supply duct port 42a of the air supply duct 42 at the upper cart-facing opening 22a to the upper duct-facing opening 36a of the galley cart 24a, the air supply docking interface 62a comprising a valve control actuator 66a and an electronically actuated air supply valve 64a for controlling a variable flow rate of the cooling air from the air supply duct 42 into the galley cart 24a. In an exemplary embodiment, the electronically actuated valve 64a includes a shape memory alloy or an electronic solenoid. The electronically actuated valve 64a may be operatively coupled to a controller 32. For example, the controller 32 may be operatively coupled to a valve control actuator 66a, which is operatively coupled to the electronically actuated valve 64a. The electronically actuated valve 64a may be operable in either a fully open configuration, a fully closed position, or any operational position between fully open and fully closed. Accordingly, the controller 32 may control a valve position of the electronically actuated valve 64a to fully closed, partially open, or fully opened.

Likewise, an air return docking interface 68a is provided to detachably couple the lower cart-facing opening 23a to the lower duct-facing opening 37a of the galley cart 24a. The air return docking interface 68a may comprise an air return valve 70a for controlling a variable flow rate of the heated air from the galley cart 24a into the space 38 and the air return duct 44. The air return valve 70a may be operable in either a fully open configuration, a fully closed position, or any operational position between fully open and fully closed.

Likewise, a second air return docking interface 68b is provided to detachably couple the second lower cart-facing opening 23b to the second lower duct-facing opening 37b of the second galley cart 24b. The second air return docking interface 68b may comprise a second air return valve 70b for controlling a variable flow rate of the heated air from the second galley cart 24b into the space 38 and the air return duct 44.

The controller 32 may control the electronically actuated valve 64a to control air flow until the air temperature sensor 74 indicates a predetermined air temperature. The air temperature sensor 74 may be installed within or proximate to the air supply duct 42 or the air return duct 44. In operation, an air temperature sensor 74 installed within the air supply duct 42 senses the temperature of the cooling air being supplied to the galley compartment 12 via the air supply duct 42 and provides real-time feedback to the controller 32 to enable the controller 32 to adjust or modify the operational temperature of the cooling air being supplied to the galley compartment 12. Likewise, an air temperature sensor 74 may be installed within the air return duct 44 to sense the temperature of the heated air being discharged from the galley compartment 12 via the air return duct 44 and provides real-time feedback to the controller 32 to enable the controller 32 to adjust or modify the operational temperature of the cooling air being input to the galley compartment 12.

Alternatively, or in conjunction with the air temperature sensor 74, the controller 32 may control the electronically actuated valve 64a to control air flow until the air flow sensor 76 indicates a predetermined air flow rate. The air flow sensor 76 may be installed within or proximate to the air supply duct 42 or the air return duct 44. In operation, an air flow sensor 76 installed within the air supply duct 42 may sense the flow of the cooling air being supplied to the galley compartment 12 via the air supply duct 42 and provide real-time feedback to the controller 32 to enable the controller 32 to adjust or modify the flow rate of the cooling air being supplied to the galley compartment 12. Likewise, an air flow sensor 76 installed within the air return duct 44 may sense the flow of the heated air being discharged from the galley compartment 12 via the air return duct 44 and provide real-time feedback to the controller 32 to enable the controller 32 to adjust or modify the pressure or volume of the cooling air being supplied to the galley compartment 12.

Optionally, other sensors provided may include pressure sensors for measuring a pressure or volume of cooling air being supplied to and/or returned from the galley compartment 12.

In operation, output from the sensors, including the air temperature sensor 74 and/or the air flow sensor 76, are input to the controller 32. In one embodiment, the controller 32 utilizes the inputs from the sensors 74, 76 to facilitate maintaining the temperature within the galley compartments 12 and/or the galley carts 24 based on a predetermined temperature. In various embodiments, the controller 32 is mounted to the galley monument 30, such as near the counter area 28 or proximate to the heat exchanger 40 to enable an operator to provide inputs to the controller 32. The controller 32 may be embodied as a processor 33 and non-volatile memory 34 storing instructions 35. The processor 33 is a microprocessor that include one or more of a central processing unit (CPU), a graphical processing unit (GPU), an application specific integrated circuit (ASIC), a system on chip (SOC), a field-programmable gate array (FPGA), a logic circuit, or other suitable type of microprocessor configured to perform the functions recited herein. The memory 34 typically includes non-volatile memory that retains stored data even in the absence of externally applied power, such as FLASH memory, a hard disk, read only memory (ROM), electrically erasable programmable memory (EEPROM), etc., and volatile memory such as random access memory (RAM), static random access memory (SRAM), dynamic random access memory (DRAM), etc., which temporarily stores data only for so long as power is applied during execution of programs. The instructions 35 executed by the processor 33 include one or more programs and data used by such programs sufficient to perform the operations described herein.

In various embodiments, the controller 32 may receive an input by the operator to maintain the contents in one of the galley compartments 12 and/or the galley cart 24a at a first predetermined temperature, and maintain the contents of a different galley compartment 12 and/or galley cart 24a at a second predetermined temperature that is different than the first predetermined temperature. In various embodiments, the contents may be embodied as food, beverages, and/or air. More specifically, when the contents are embodied as air, the galley compartment 12 or the galley cart 24a is considered to be empty and thus the cooling air being supplied to the empty galley compartment 12 or galley cart 24a may be reduced or shut off to enable additional cooling air to be supplied to the non-empty galley carts 24 or to reduce energy waste. In response, the controller 32 may evaluate the various sensor inputs and adjust the heat exchanger 40, the fan, or various other components to maintain the galley carts 24 at the desired temperatures.

By actively controlling the openings of the air supply valve 64a and air return valve 70a to open the air supply valve 64a and the air return valve just enough to release a modulated flow of cooling air into the galley cart 24a to maintain the air temperature inside the galley cart 24a at a predetermined air temperature, the rate of cooling air flow into the galley cart 24a can be reduced below conventional cooling air flow rates in current state-of-the-art galley refrigeration systems. For example, depending on the target predetermined air temperature that is set for the inside of the galley cart 24a, a conventional cooling air flow rate of approximately 400 cubic feet per minute in a six-cart system may be dropped by a factor of three or four to approximately 100 cubic feet per minute or less.

Modulated evaporator airflows enable the evaporator system airflow rates to be much smaller. In turn, smaller evaporator system airflow rates enable the condenser system air flow rates to be much smaller. By reducing evaporator air flow rates and condenser air flow rates, the energy requirements of the heat exchanger 40 are further reduced. Smaller evaporator system airflow rates generate much smaller defrost condensate rates to be removed by the galley refrigeration system 100, thereby dispensing with the need to utilize the plumbing drain system of the aircraft 800 to remove defrost condensate. By increasing the thermal efficiency of the refrigeration system, the amount of work required to cool down the galley compartment 12 along with the reduced evaporator and condenser airflow rates are minimized, and the generated machine heat that is transferred into the galley cabin zone is also minimized. This reduction in generated machine heat along with the associated smaller condenser system airflow rates enable these condenser airflows to originate from the galley cabin 815 and flow back into the galley cabin 815, and thereby make the galley refrigeration system physically contained within the galley and functionally contained within the galley zone.

A refrigeration system that performs significantly less work can utilize a compact heat exchanger. Such a smaller heat exchanger 40 may be positioned away from the crown of the galley monument 30, for example, where substantial ducting would be installed to flow air from the heat exchanger 40 into the galley compartments 12. Instead, the compact heat exchanger 40 can be installed closer to the galley cart 24a, thereby reducing the length of the air supply duct 42 to flow cooling air from the heat exchanger 40 to the galley cart 24a, and also reducing the length of the air return duct 44 to flow heated air from the galley cart 24a back into the heat exchanger 40. A shorter air supply duct 42 and a shorter air return duct 44 result in further lowering the heat content and increasing the heat efficiency of the galley refrigeration system 100.

A smaller heat exchanger 40 and shorter ducts 42, 44 allow for independence of the galley refrigeration system 100 from the plumbing system and the environmental control system of the aircraft 800. In other words, the ducting system of the galley refrigeration system 100, including the air supply duct 42, air return duct 44, condenser supply duct 60, and condenser exhaust duct 58, are not connected to the ducting system of the environmental control system of the aircraft 800. In addition, a drain sump is not required because the low amounts of defrost condensate will be removed via the condenser exhaust airflow into the galley zone. Therefore, the galley refrigeration system 100 can be easily installed and uninstalled from the aircraft 800 without interfering with the existing plumbing system and environmental control system of the aircraft 800, allowing installation in many different types of aircraft with differing plumbing systems and environmental control systems, so that the galley refrigeration system 100 is adaptable for use on multiple different aircraft, each aircraft having a differently sized galley. Note that the present disclosure is based on locating this compact, low heat gain, and low energy consuming system adjacent to the carts to further minimize heat gains and ducting airflow resistance.

Figure 5:
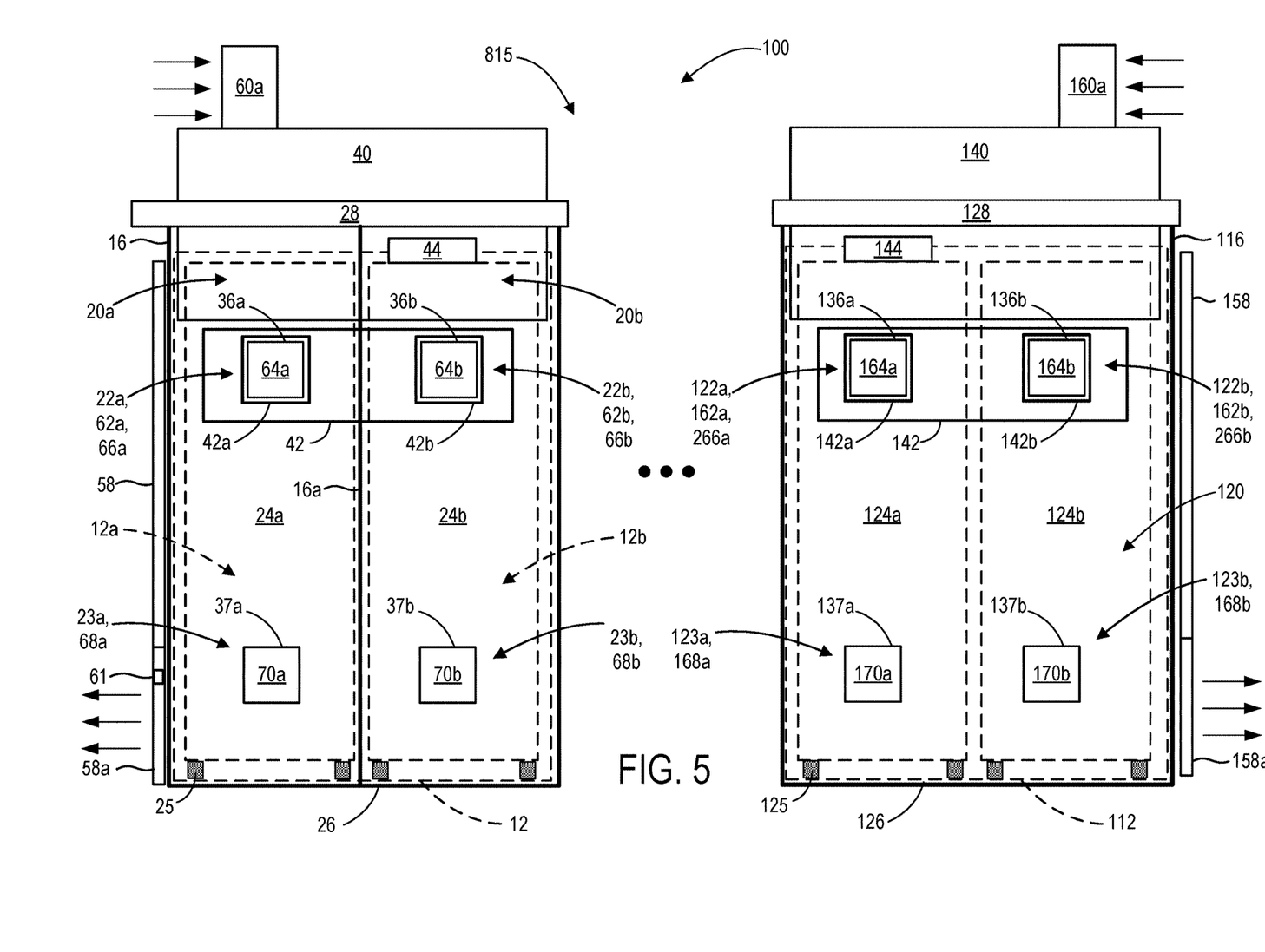
FIG. 5 is a frontal representation of a galley monument and exemplary galley refrigeration system in accordance with the first embodiment.

Referring to FIG. 5, in an exemplary embodiment, the galley refrigeration system 100 includes one air supply valve 64 for each galley cart 24. For example, in the illustrated embodiment, the refrigeration system 100 includes two galley carts 24a and 24b and two corresponding electronically actuated air supply valves 64a and 64b associated with each respective galley cart 24a and 24b. In this embodiment, there is an internal side wall 16a separating the galley compartment 12 housing the two galley carts 24a and 24b into two separate and adjacent galley compartments 12a, 12b comprising two separate and adjacent cavities 20a, 20b, respectively. However, in alternative embodiments, there may be no side wall provided to separate the first galley compartment 12a housing the first galley cart 24a from the second galley compartment 12b housing the second galley cart 24b. It will be appreciated that the refrigeration system 100 may include any number of galley carts 24 and valves 64 in alternative embodiments, including just one galley cart 24 and one valve 64.

In this exemplary embodiment, in addition to the first galley compartment 12a, the galley refrigeration system 100 comprises a second galley compartment 12b comprising at least the back wall 14 and a pair of second side walls 16 defining a second cavity 20b, the second galley compartment 12b comprising at least a second cart-facing opening 22b positioned in the vertically intermediate region 14a of the back wall 14. The second galley cart 24b is positionable in the second cavity 20b of the second galley compartment 12b. The second galley cart 24b has a second upper duct-facing opening 36b, the second upper duct-facing opening 36b of the second galley cart 24b being positioned adjacent to the second upper cart-facing opening 22b of the second galley compartment for air-through-cart cooling of the second galley cart.

In addition to the first docking interface 62a, a second docking interface 62b is configured to detachably couple a second air supply duct port 42b of the air supply duct 42 at the second upper cart-facing opening 22b to the second upper duct-facing opening 36b of the second galley cart 24b, the second docking interface 62b comprising a second electronically actuated valve 64b for controlling a variable flow rate of the cooling air from the air supply duct 42 into the second galley cart 24b. In one possible configuration, the controller 32 controls a valve control actuator 66a to control valve positions of the first docking interface 62a, and controls a valve control actuator 66b to control valve positions of the second docking interface 62b to allocate the airflow distribution within the air supply duct 42 connecting the first galley compartment 12a and the second galley compartment 12b with the heat exchanger 40. In other words, with this configuration, the controller 32 controls the air supply valve 64a of the first cart 24a and the air supply valve 64b of the second galley cart 24b to ensure that airflow is allocated to independently control the food temperatures within the two galley carts 24a, 24b. In another possible configuration, the controller 32 controls the valve control actuator 66a to control valve positions of the first docking interface 62a, and controls the valve control actuator 66b to control valve positions of the second docking interface 62b to maintain the temperatures within the galley compartments 12 and/or the galley carts 24 based on predetermined temperatures utilizes the inputs from the air temperature sensor 74 and/or the air flow sensor 76.

The electronically actuated air supply valves 64a, 64b are operated to enable cooled air to be supplied directly to the galley carts 24a, 24b in an air-through cooling arrangement and to the galley compartments 12a, 12b surrounding the respective galley carts 24a, 24b in an air-over cooling arrangement. In an exemplary embodiment, one return valve 70 is provided for each galley cart 24; however, any number of return valves 70 may be provided. Using multiple controllable supply valves 64 and multiple return valves 70 enables the galley refrigeration system 100 to provide regulation of the quantity of cooling air being supplied to the galley carts 24.

In the schematic illustration of FIG. 5, a heat exchanger 40 is configured to cool the galley carts 24a and 24b in the galley compartments 12a, 12b. The air supply duct 42 has a first air supply duct port 42a that is docked to the upper duct-facing opening 36a of the first galley cart 24a, and a second air supply duct port 42b that is docked to the upper duct-facing opening 36b of the second galley cart 24b. In this embodiment, the condenser exhaust 58a is provided at a bottom wall 26 of the galley compartment and configured to discharge exhaust airflow out of the galley compartment 12 into the galley area 815 of the cabin 810; and the condenser intake 60a is provided at a top side of the heat exchanger 40 and configured to intake air from the galley area 815 of the cabin 810. However, in other embodiments, the condenser exhaust 58a may alternatively be provided at a top side of the heat exchanger 40 and configured to discharge exhaust airflow out of the galley compartment from the top side of the heat exchanger 40; and the condenser intake 60a may alternatively be provided at a side wall of the heat exchanger 40.

In addition to the first galley compartment 12a, the galley refrigeration system 100 may further comprise a third galley compartment 112 comprising at least the back wall 114 and a pair of second side walls 116 defining a third cavity 120, the third galley compartment 112 comprising at least an upper cart-facing opening 122a positioned in the vertically intermediate region 114a of the back wall 114. As the configuration of the galley compartment 112, heat exchanger 140, and ducts 142, 144 are substantially similar to the configuration of the galley compartment 12, heat exchanger 40, and ducts 42, 44, the detailed description thereof is abbreviated here for the sake of brevity. It is to be noted that like parts are designated by like reference numerals throughout the detailed description and the accompanying drawings.

In a galley area 815 that spans an entire width of the cabin 810, the galley compartment 12, heat exchanger 40, and ducts 42, 44, 58, 60 may be situated at a first end of the galley area 815, while the galley compartment 112, heat exchanger 140, and ducts 142, 144, 158, 160 may be symmetrically situated at a second end of the galley area 815. It will be appreciated that the spatial configuration of the condenser intake 60a and condenser exhaust 58a mirrors the spatial configuration of the condenser intake 160a and the condenser exhaust 158a. In other words, a first condenser intake 60a and a first condenser exhaust 58a at the first galley compartment 12 are arranged symmetrically to a second condenser intake 160a and a second condenser exhaust 158a at the second galley compartment 112 across a width of the galley area 815. For example, the first condenser intake 60a and the first condenser exhaust 58a may be arranged symmetrically to the second condenser intake 160a and the second condenser exhaust 158a across at least one of a front of the galley area 815 and outboard surfaces of the side walls 16, 116 of the galley compartments 12, 112, the outboard surfaces of the side walls 16, 116 including portions adjacent to at least one of a counter area 28, 128 of a galley monument, a floor of the galley area 815, and a ceiling of the galley area 815. Accordingly, the condenser air flows are balanced at both ends of the galley area 815, so that no dynamic pressure gradient that pulls air from one end of the galley area 815 into the other end of the galley area 815, preventing galley cabin zone odors from migrating to passenger areas. In other words, the intake of air by the condenser intake 60a and the exhaust of air by the condenser exhaust 58a are balanced out by the intake of air by the condenser intake 160a and the exhaust of air by the condenser exhaust 158a. It will be appreciated that this condenser intake and condenser exhaust symmetry may also be achieved with the condenser intakes 60a and 160a and condenser exhausts 58a and 158a connected to a single heat exchanger via branched condenser ducting. Further, although heat exchangers 40 and 140 are each represented as one heat exchangers in FIG. 5, it will be appreciated that each heat exchanger 40 and 140 may alternatively be replaced with a plurality of heat exchangers. Moreover, for embodiments in which only a single condenser exhaust 58a and a single condenser intake 60a are provided in the galley refrigeration system 100, the single condenser exhaust 58a and the single condenser intake 60a may be provided near to the lateral centerline of the galley area 815 in order to minimize a potential local cabin air pressure gradient which could lead to galley odors migrating into the seating zone.

In some embodiments, at least one of the condenser intakes 60a, 160a and condenser exhausts 58a, 158a may be configured as a controllable, electronically actuated valve operatively coupled to a valve control actuator and a controller 32. The controller 32 may control at least one of the condenser intakes 60a, 160a and condenser exhausts 58a, 158a to control intake air flow and/or exhaust air flow based on output from a sensor 61, which may be installed within or proximate to at least one of the condenser intakes 60a, 160a and condenser exhausts 58a, 158a. For example, when configured to measure air temperature in a vicinity of the condenser exhaust 58a, the sensor 61 may sense the temperature of the air in the vicinity of the condenser exhaust 58a, and provide real-time feedback to the controller 32 to enable the controller 32 to adjust or modify the opening of the condenser exhaust 58a to raise or lower the air temperature sensed by the sensor 61. Alternatively, when configured to sense a flow of the exhaust air being discharged from the condenser exhaust 58a, the sensor 61 may sense the exhaust air flow from the condenser exhaust 58a, and provide real-time feedback to the controller 32 to enable the controller 32 to adjust or modify the opening of the condenser exhaust 58a to raise or lower the flow rate of exhaust air released from the condenser exhaust 58a into a galley area 815 of the cabin 810. Accordingly, warm condenser exhaust airflow may be controlled by a user to flow towards desired areas of the galley area 815, such as the floor area, and condenser intake air flows and condenser exhaust air flows may be actively controlled to maintain a symmetry in the condenser intake and condenser exhaust air flows across a width of the galley area 815.

Figure 6:
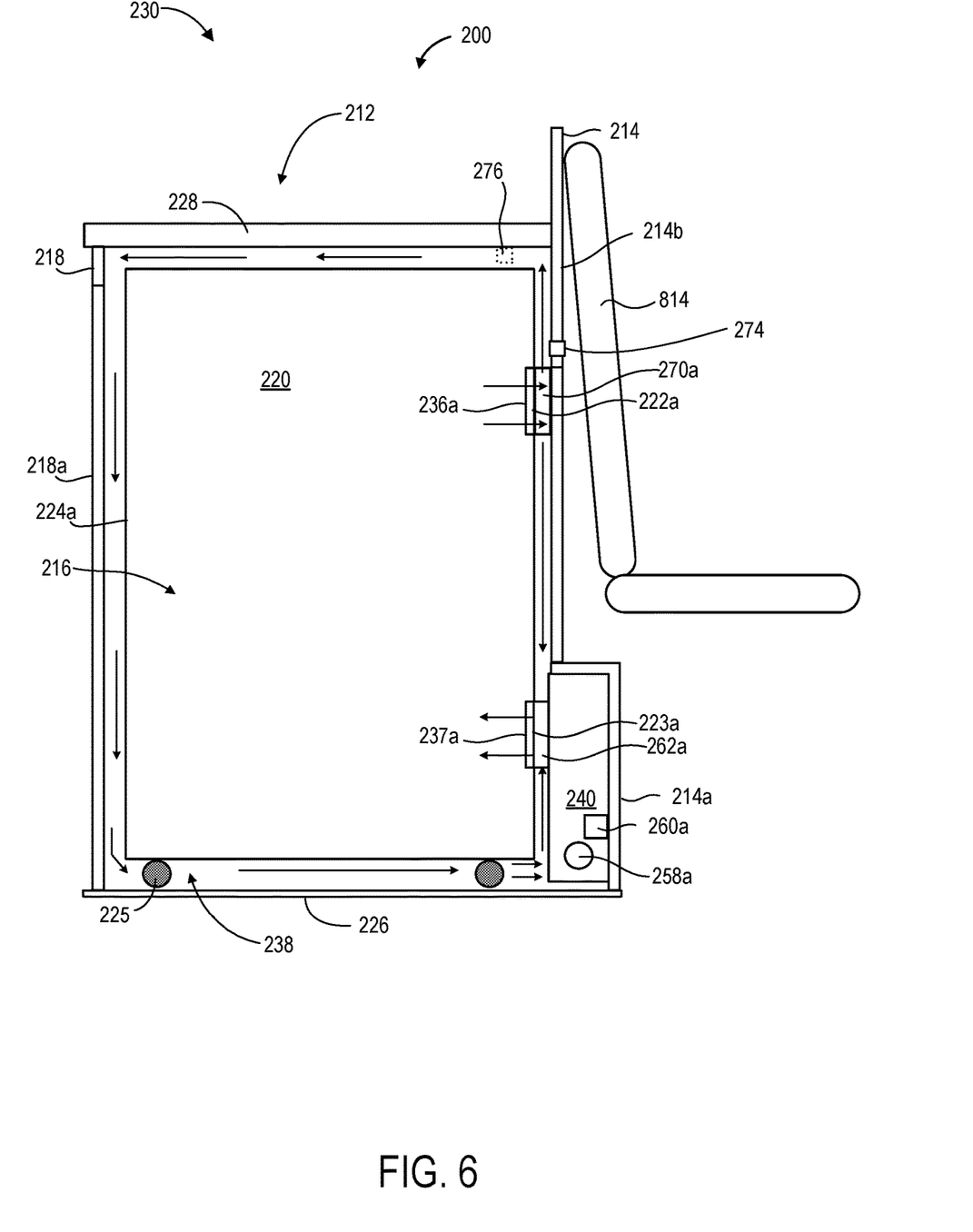
FIG. 6 is a cross-sectional side representation of a galley monument and exemplary galley refrigeration system in accordance with a second embodiment.
Figure 7:
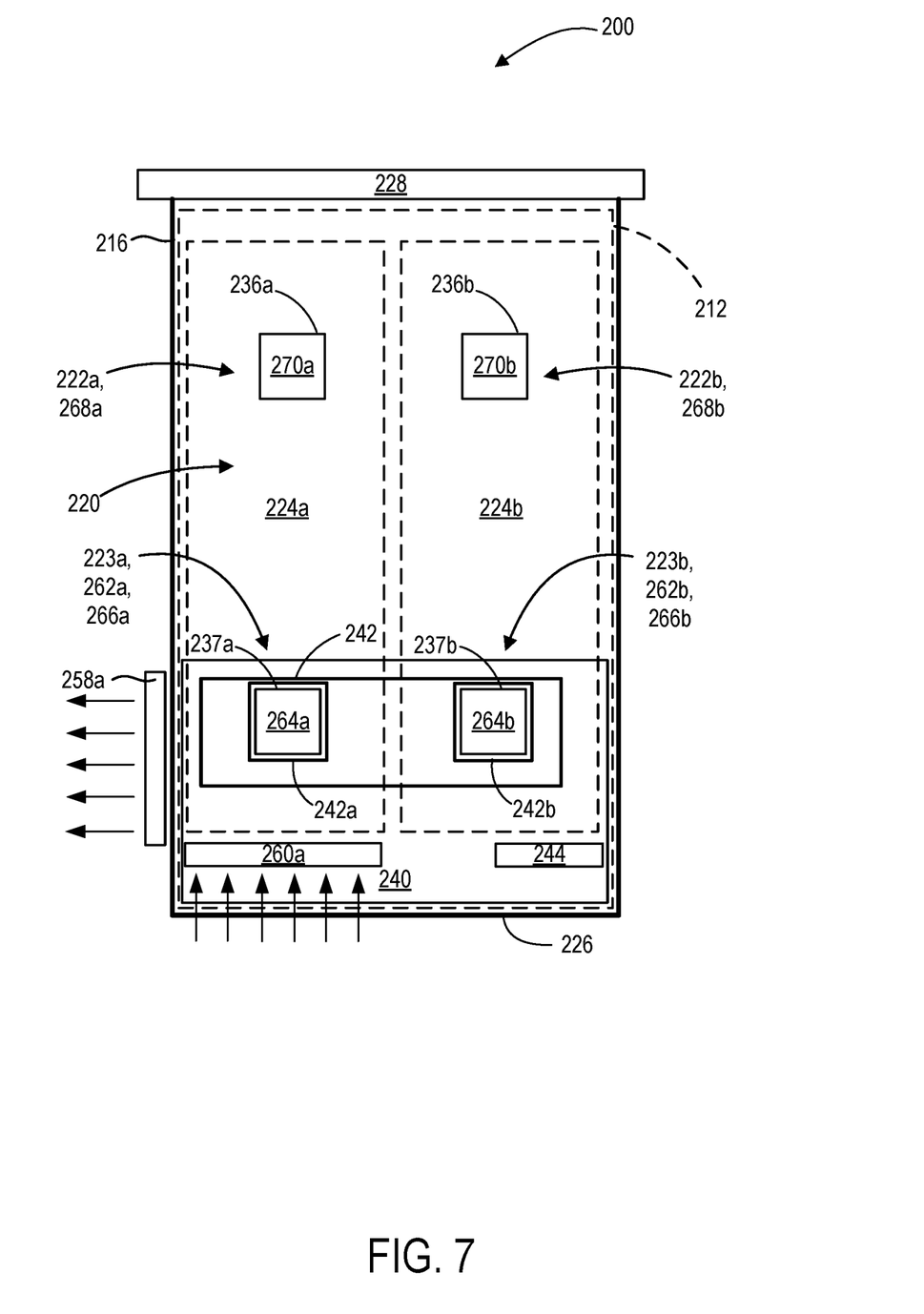
FIG. 7 is a frontal representation of a galley monument and exemplary galley refrigeration system in accordance with the second embodiment.

Referring to FIGS. 6 and 7, a galley refrigeration system 200 is depicted according to a second embodiment of the present disclosure, comprising a galley compartment 212 comprising at least a back wall 214 and a pair of side walls 216 defining a cavity 220. The galley compartment 212 comprises at least an upper cart-facing opening 222a positioned in an upper region 214b of the back wall 214, and lower cart-facing opening 223a positioned in the lower region 214a of the back wall 214. At least a portion of the heat exchanger 240 may be provided within the galley compartment 212 and adjacent to the lower region 214a of the back wall 214 of the galley compartment 212 defining the cavity 220. The cavity 220, defined by at least the back wall 214 and the pair of side walls 216, is configured to receive at least a galley cart 224a. The galley carts 224 may include wheels 225, however some galley carts 224 may be hand carried boxes in some embodiments.

In an exemplary embodiment, the cavity 220 of the galley compartment 212 may also be defined by a bottom wall 226, a top wall 228, a front wall 218, and a door 218a. As the walls of the cavity 220 are substantially similar to those of the galley compartment 12 of the first embodiment, the detailed description thereof is abbreviated here for the sake of brevity. It is to be noted that like parts are designated by like reference numerals throughout the detailed description and the accompanying drawings.

The galley refrigeration system 200 further comprises a galley cart 224a positionable in the cavity 220 of the galley compartment 212, the galley cart 224a having a lower duct-facing opening 237a, the lower duct-facing opening 237a of the galley cart 224a being positioned adjacent to the lower cart-facing opening 223a of the galley compartment 212 for air-through-cart cooling of the galley cart 224a. A second galley cart 224b may also be positionable in the cavity 220 of the galley compartment 212, the second galley cart 224b having a second lower duct-facing opening 237b, the second lower duct-facing opening 237b of the galley cart 224b being positioned adjacent to the second lower cart-facing opening 223b of the galley compartment 212 for air-through-cart cooling of the galley cart 224b. In this embodiment, there is no internal side wall to separate the galley compartment 212 into two separate compartments. However, in alternative embodiments, there may be a side wall separating one compartment housing the first galley cart 224a from another compartment housing the second galley cart 224b. It will be appreciated that the refrigeration system 200 may include any number of galley carts 224 in alternative embodiments, including just one galley cart 224.

Like the heat exchanger 40 of the first embodiment, the heat exchanger 240 of the second embodiment also involves the condensation of vapor and heating and cooling of refrigerant to generate cooling air flow. Accordingly, a condenser intake 260a is provided at the bottom of the galley compartment 212 to bring air flow to the condenser in the heat exchanger 240, which cools the condenser and causes the airflow to be heated. A condenser exhaust 258a is provided to expel the heated exhaust airflow from the heat exchanger 240. In this embodiment, the condenser exhaust 258a is provided at a lower side wall of the galley compartment and configured to discharge exhaust airflow out of the galley compartment 212; and the condenser intake 260a is provided at a bottom wall 226 of the heat exchanger 240. However, the positions of the condenser exhaust 250a and the condenser intake 260a are not particularly limited. In some embodiments, the condenser exhaust 258a may alternatively be provided at a top side of the heat exchanger 40 and configured to discharge exhaust airflow out of the galley compartment from the top side of the heat exchanger 240; and the condenser intake 260a may alternatively be provided at a side wall of the heat exchanger 240. The condenser exhaust 250 and condenser intake 260a may also be ducted to be positioned at predetermined locations along the side walls 216 facing the galley zone in a symmetrical arrangement across a width of the galley area 815.

The heat exchanger 240 is configured to cool the galley carts 224a and 224b in the galley compartment 212 by passing cooling air to the galley compartment 212 through an air supply duct 242 provided internally within the heat exchanger 240. As the air supply duct is 242 is not provided externally of the heat exchanger 240, heat gains through the air supply duct 242 are minimized. The air supply duct 242 has a first air supply duct port 242a that is docked to the lower duct-facing opening 237a of the first galley cart 224a, and a second air supply duct port 242*b* that is docked to the second lower duct-facing opening 237*b* of the second galley cart 224*b*.

The galley refrigeration system 200 may include one air supply valve 264 for each galley cart 224*a*, 224*b*. For example, in the illustrated embodiment, the refrigeration system 200 includes two galley carts 224*a* and 224*b* and two corresponding electronically actuated air supply valves 264*a* and 264*b* associated with each respective galley cart 224*a* and 224*b*. However, it will be appreciated that the refrigeration system 200 may include any number of air supply valves 264 in alternative embodiments. The electronically actuated air supply valve 264*a* is operated to enable cooled air to be supplied directly to the galley cart 224*a* in an air-through cooling arrangement and to the galley compartment 212 surrounding the respective galley cart 224*a* in an air-over cooling arrangement.

Moreover, an air supply docking interface 262*a* is provided to detachably couple the heat exchanger 240 at the lower cart-facing opening 223*a* to the lower duct-facing opening 237*a* of the galley cart 224*a*, the air supply docking interface 262*a* comprising the electronically actuated air supply valve 264*a* for controlling a variable flow rate of the cooling air from the heat exchanger 240 into the galley cart 224*a*. In this exemplary embodiment, the electronically actuated valve 264*a* may include a shape memory alloy or an electronic solenoid. The electronically actuated valve 264*a* may be operatively coupled to a controller. For example, the controller may be operatively coupled to a valve control actuator, which is operatively coupled to the electronically actuated valve 264*a*. The electronically actuated valve 264*a* may be operable in either a fully open configuration, a fully closed position, or any operational position between fully open and fully closed. Accordingly, the controller may control a valve position of the electronically actuated valve 264*a* to fully closed, partially open, or fully opened.

Likewise, a second air supply docking interface 262*b* is provided to detachably couple the heat exchanger 240 at the second lower cart-facing opening 223*b* to the second lower duct-facing opening 237*b* of the second galley cart 224*b*, the air supply docking interface 262*b* comprising the second electronically actuated air supply valve 264*b* for controlling a variable flow rate of the cooling air from the heat exchanger 240 into the second galley cart 224*b*.

An air temperature sensor 274 may be installed within or proximate to the air supply duct 242 or the air return duct 244. The controller may control the electronically actuated valves 264*a* and 264*b* to control air flow until the air temperature sensor 274 indicates a predetermined air temperature. Alternatively, or in conjunction with the air temperature sensor 274, an air flow sensor 276 may be installed within or proximate to the air supply duct 242 or the air return duct 244. The controller may control the electronically actuated valves 264*a* and 264*b* to control air flow until the air flow sensor 276 indicates a predetermined air flow rate.

The galley refrigeration system 200 may include one air return valve 270 for each galley cart 224*a*, 224*b*. For example, in the illustrated embodiment, the refrigeration system 200 includes two galley carts 224*a* and 224*b*. Two corresponding air return valves 270*a* and 270*b* associated with each respective galley cart 224*a* and 224*b* may optionally be included in the refrigeration system 200. However, it will be appreciated that the refrigeration system 200 may include any number of air return valves 270 in alternative embodiments. The air return valve 270*a* is operated to enable heated air in the galley cart 224*a* and the galley compartment 212 surrounding the respective galley cart 224*a* to return to the heat exchanger 240.

The galley cart 224*a* has an upper duct-facing opening 236*a* which is positioned adjacent to the upper cart-facing opening 222*a* of the galley compartment 212. An air return docking interface 268*a* is provided to detachably couple the upper cart-facing opening 222*a* to the upper duct-facing opening 236*a* of the galley cart 224*a*, the air return docking interface 268*a* comprising the air return valve 270*a* for controlling a variable flow rate of the heated air from the galley cart 224*a* into the space 238 and the air return duct 244. The air return valve 270*a* may be operable in either a fully open configuration, a fully closed position, or any operational position between fully open and fully closed. Accordingly, the heat exchanger 240 and the air return duct 244, in flow communication with the galley compartments 212, channel the air supply from the heat exchanger 240 to the galley compartment 212 and the galley cart 224*a* and back to the heat exchanger 240.

Likewise, the second galley cart 224*b* has an upper duct-facing opening 236*b* which is positioned adjacent to the upper cart-facing opening 222*b* of the galley compartment 212. An air return docking interface 268*b* is provided to detachably couple the second upper cart-facing opening 222*b* to the second upper duct-facing opening 236*b* of the second galley cart 224*b*, the second air return docking interface 268*b* comprising the second air return valve 270*b* for controlling a variable flow rate of the heated air from the second galley cart 224*b* into the space 238 and the air return duct 244.

In accordance with this configuration, the controller controls the first air supply valve 264*a* of the first galley cart 224*a* and the second air supply valve 264*b* of the second galley cart 224*b* to ensure that no pressure gradient exists between the two carts.

Like the embodiment depicted in FIG. 5, the galley refrigeration system 200 may be arranged such that, in a galley area 815 that spans an entire width of the cabin, the galley compartment 212, heat exchanger 240, and ducts 242, 244, 258, 260 may be situated at a first end of the galley area 815, while another galley compartment, heat exchanger, and ducts may be symmetrically situated at a second end of the galley area 815, so that the spatial configuration of the condenser intake 260*a* and condenser exhaust 258*a* mirrors the spatial configuration of the other condenser intake and the other condenser exhaust. Accordingly, the condenser air flows are balanced at both ends of the galley area 815, so that no dynamic pressure gradient that pulls air from one end of the galley area 815 into the other end of the galley area 815. It will be appreciated that this condenser intake and condenser exhaust symmetry may also be achieved with the condenser intakes and condenser exhausts connected to a single heat exchanger via branched condenser ducting.

Accordingly, galley refrigeration systems 100 and 200 contained within the galley 815 of the aircraft 800 and functionally independent of the environmental control system and plumbing system of the aircraft are achieved. A hybrid combination of both an air-through-cart supply arrangement and an air-over-cart supply arrangement achieves lower system heat gain and faster air temperature pull down capabilities with smaller exhaust heat and airflow signatures, further enabling independent cooling of sections of the galley compartments, such as individual galley carts. Modulated air flows of cooling air actively controlled by air supply valves allow galley carts to receive just enough cooling air to fulfill cooling requirements predetermined for the galley compartments, potentially reducing the total system air flow of cooling air supplied to the galley carts and also reducing the air flows of condenser intake air and condenser exhaust, thereby reducing energy requirements of the heat exchanger and allowing for a more compact sized heat exchanger. A compact heat exchanger may be modularly installed at a galley monument, closer to the galley compartments and galley carts, so that air supply ducts, air return ducts, condenser supply ducts, and condenser exhaust ducts can be reduced in length accordingly, reducing heat gain in the galley refrigeration system. A modularly installable heat exchanger means that the heat exchanger can be easily replaced in an aircraft, as opposed to heat exchangers and ducting that physically interface with the environmental control system and plumbing system of the aircraft and are installed remotely from the galley, e.g., on top of the galley in the crown space. A symmetrical arrangement of the locations of the condenser exhaust and condenser intake ports along a galley zone ensures that dynamic pressure gradients do not develop within the air space of the cabin, preventing galley cabin zone odors from migrating to passenger areas of the cabin, for example.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A galley refrigeration system comprising:
a galley compartment comprising at least a back wall and a pair of side walls defining a cavity, the galley compartment comprising at least a cart-facing opening positioned in a vertically intermediate region of the back wall;
a galley cart positionable in the cavity of the galley compartment, the galley cart or the galley compartment having a duct-facing opening, the duct-facing opening being positioned adjacent to the cart-facing opening of the galley compartment for air-through-cart or air-over-cart cooling of the galley cart;
a heat exchanger configured to generate cooling air;
an air supply duct provided at the cart-facing opening in the vertically intermediate region of the back wall, configured to guide the cooling air from the heat exchanger into the galley cart, and configured to be detachably coupled to the duct-facing opening in flow communication with the duct-facing opening; and
a docking interface configured to detachably couple a first air supply duct port of the air supply duct at the cart-facing opening to the duct-facing opening, the docking interface comprising an electronically actuated valve for controlling a variable flow rate of the cooling air from the air supply duct into the galley cart, wherein
at least a portion of the heat exchanger is provided within the galley compartment, adjacent the vertically intermediate region of the back wall of the galley compartment defining the cavity.

2. The galley refrigeration system of claim 1, further comprising a controller, wherein
the electronically actuated valve of the docking interface is operatively coupled to the controller, the controller controlling a valve position of the electronically actuated valve to fully closed, partially open, or fully opened.

3. The galley refrigeration system of claim 2, wherein
the electronically actuated valve includes a shape memory alloy or an electronic solenoid.

4. The galley refrigeration system of claim 2, further comprising an air temperature sensor, wherein
the controller controls the electronically actuated valve to control air flow until the air temperature sensor indicates a predetermined air temperature.

5. The galley refrigeration system of claim 2, further comprising an air flow sensor, wherein
the controller controls the electronically actuated valve to control air flow until the air flow sensor indicates a predetermined air flow rate.

6. The galley refrigeration system of claim 2, further comprising:
a second galley compartment comprising at least the back wall and a pair of second side walls defining a second cavity, the second galley compartment comprising at least a second cart-facing opening positioned in the vertically intermediate region of the back wall; and
a second galley cart positionable in the second cavity of the second galley compartment, the second galley cart having a second duct-facing opening, the second duct-facing opening of the second galley cart being positioned adjacent to the second cart-facing opening of the second galley compartment for air-through-cart cooling of the second galley cart, wherein
the galley compartment is a first galley compartment; and
a first condenser intake and a first condenser exhaust at the first galley compartment are arranged symmetrically to a second condenser intake and a second condenser exhaust at the second galley compartment across a width of a galley area of a cabin.

7. The galley refrigeration system of claim 1, wherein
the cart-facing opening of the galley compartment is detachably attached to the first air supply duct port of the air supply duct.

8. The galley refrigeration system of claim 6, wherein
at least one of the first condenser intake, the first condenser exhaust, the second condenser intake, and the second condenser exhaust is configured as a controllable, electronically actuated valve operatively coupled to the controller.

9. The galley refrigeration system of claim 1, wherein
an entirety of the air supply duct is provided within the galley compartment.

10. The galley refrigeration system of claim 1, further comprising:
an air return duct detachably attached to the heat exchanger and configured to guide heated air from the galley cart and/or galley compartment into the heat exchanger.

11. The galley refrigeration system of claim 1, wherein
the heat exchanger comprises a compressor, an evaporator, and a condenser provided with a condenser intake configured to intake air from a galley area of a cabin and a condenser exhaust configured to discharge exhaust airflow into the galley area of the cabin.

12. The galley refrigeration system of claim 1, further comprising:
a second galley compartment comprising at least the back wall and a pair of second side walls defining a second cavity, wherein
the galley compartment is a first galley compartment; and a first condenser intake and a first condenser exhaust at the first galley compartment are arranged symmetrically to a second condenser intake and a second condenser exhaust at the second galley compartment across a width of a galley area of a cabin.

13. The galley refrigeration system of claim 12, wherein the first condenser intake and the first condenser exhaust are arranged symmetrically to the second condenser intake and the second condenser exhaust across at least one of a front of the galley area and outboard surfaces of the side walls of the galley compartments, the outboard surfaces of the side walls including portions adjacent to at least one of a counter area of a galley monument, a floor of the galley area, and a ceiling of the galley area.

14. The galley refrigeration system of claim 1, further comprising:
a galley monument with a counter area, wherein
the galley compartment is provided below the counter area of the galley monument; and
the heat exchanger is provided adjacent to the counter area.

15. A galley refrigeration system comprising:
a galley compartment comprising at least a back wall and a pair of side walls defining a cavity, the galley compartment comprising at least a cart-facing opening positioned in a lower region of the back wall;
a galley cart positionable in the cavity of the galley compartment, the galley cart or the galley compartment having a duct-facing opening, the duct-facing opening being positioned adjacent to the cart-facing opening of the galley compartment for air-through-cart or air-over-cart cooling of the galley cart;
a heat exchanger configured to generate cooling air and provided adjacent to the cart-facing opening;
an air return duct configured to guide heated air from the galley cart into the heat exchanger, and configured to be detachably coupled to the heat exchanger;
a docking interface configured to detachably couple a first air supply duct port of an air supply duct at the cart-facing opening to the duct-facing opening of the galley cart, the docking interface comprising an electronically actuated valve for controlling a variable flow rate of the cooling air from the air supply duct into the galley cart, wherein
at least a portion of the heat exchanger is provided within the galley compartment and adjacent to the lower region of the back wall of the galley compartment defining the cavity.

16. The galley refrigeration system of claim 15, further comprising a controller, wherein
the electronically actuated valve of the docking interface is operatively coupled to the controller, the controller controlling a valve position of the electronically actuated valve to fully closed, partially open, or fully opened.

17. The galley refrigeration system of claim 16, wherein the electronically actuated valve includes a shape memory alloy or an electronic solenoid.

18. The galley refrigeration system of claim 16, further comprising an air temperature sensor, wherein
the controller controls the electronically actuated valve to control air flow until the air temperature sensor indicates a predetermined air temperature.

19. The galley refrigeration system of claim 16, further comprising an air flow sensor, wherein
the controller controls the electronically actuated valve to control air flow until the air flow sensor indicates a predetermined air flow rate.

20. The galley refrigeration system of claim 15, wherein the heat exchanger comprises a compressor, an evaporator, and a condenser provided with a condenser intake configured to intake air from a galley area of a cabin and a condenser exhaust configured to discharge exhaust airflow into the galley area of the cabin.

* * * * *